United States Patent [19]

Huang

[11] Patent Number: 4,926,277
[45] Date of Patent: May 15, 1990

[54] STRUCTURE IMPROVEMENT OF CLEANER TAPE CARTRIDGE FOR VIDEO TAPE RECORDER/PLAYER

[75] Inventor: Ku T. Huang, San Chung, Taiwan
[73] Assignee: Ku Te Haung, San Chung, Taiwan
[21] Appl. No.: 247,482
[22] Filed: Sep. 21, 1988
[51] Int. Cl.⁵ .............................................. G11B 5/41
[52] U.S. Cl. .................................... 360/128; 360/132
[58] Field of Search ....................... 360/128, 132, 137; 15/DIG. 12–13

[56] References Cited

U.S. PATENT DOCUMENTS 4,524,926 6/1985 Nemoto .......................... 360/132 X

FOREIGN PATENT DOCUMENTS 59-87618 5/1984 Japan .................................... 360/128

Primary Examiner—A. J. Heinz
Attorney, Agent, or Firm—Fleit, Jacobson, Cohn, Price, Holman & Stern

[57] ABSTRACT

A structure improvement of cleaner tape cartridge for video tape recorder/player which is characterized by providing a blockader to the protective cover of said cartridge, when the said cartridge is disposed in the camera or the adapter with larger VHS tape, the blockader can blockade the ultraviolet ray emitted from the interior of said camera or adapter so as to prevent the ultraviolet ray from penetrating the cleaner tape and being received by the receiver and to prevent the cleaner tape from generating wrong rewinding action in favor of smoothly proceeding with the operation of cleaning the magnetic head which is really a simple improved structure capable of developing great effect.

1 Claim, 4 Drawing Sheets

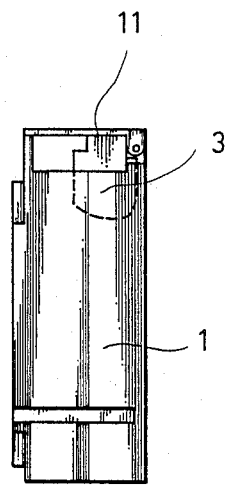
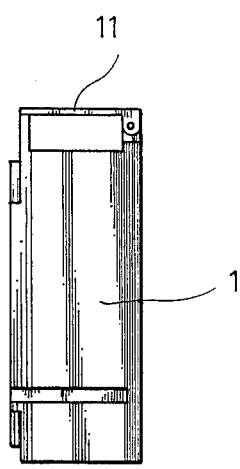
FIG.4A
FIG.4B
PRIOR ART

STRUCTURE IMPROVEMENT OF CLEANER TAPE CARTRIDGE FOR VIDEO TAPE RECORDER/PLAYER

BACKGROUND OF THE INVENTION

The electrical products resulting from modern science and technology have been produced on a large scale by mass production, and their selling prices have been gradually and extensively cut because of considerable lowering of their production costs. Therefore, the VHS-C camera and such peripheral equipment as a video tape recorder/player have become popular electrical appliances in many homes in general. A VHS-C camera may be used on its own to take cherished pictures for commemoration, and after picture-taking, all that is required is to dispose the video tape cartridge 1 in an adapter 2 (as shown in FIG. 2) to be loaded in a video tape recorder/player with larger VHS tape for viewing (because the size of said video tape cartridge is rather small, after disposing it in the adapter 2, it may be adjusted to fit the operating specification of the video tape recorder/player).

As shown in FIGS. 2 and 3, the initial state of opening the adapter 2 and disposing the video tape therein is shown in FIG. 3A, the cover member 21 of adapter 2 slightly pushes to open the protective cover 11 of video tape cartridge 1. When the cover member 21 of adapter 2 is closed, the protective cover 11 of video tape 1 is pushed to a position in which it is parallel with a side of the cartridge 1 as shown in FIG. 3B, so that the tape of the video tape cartridge 1 is in an exposed state and capable of picture-taking or video tape play-back through the operation of peripneral equipment in a camera or adapter 2.

Since the conventional cameras, video tape recorders/players and the adapter 2 have automatic rewinding equipment and a bulb to emit an ultraviolet ray, when the video tape cartridge 1 operates normally, the ultraviolet ray cannot penetrate the tape and arrive at a receiver; when the video tape is wound up to the position at the terminal end thereof which is transparent, the ultraviolet ray penetrating the tape is received by the receiver which acts quickly to actuate the camera and video tape recorder/player to proceed with the automatic rewinding action.

However, when proceeding with the operation of cleaning the magnetic head and disposing the tiny cleaner tape cartridge in the camera or adapter, the ultraviolet ray can easily penetrate the cleaner tape, so the camera or adapter is in an automatic rewinding made and cannot play normally. Therefore, the manufacturers concerned intend to directly attach an iron lamina onto the side wall surface of a video cleaner tape cartridge to block the ultraviolet ray. Such an action not only spoils the integrity and appearance of said cartridge but also enlarges the size thereof so the cartridge cannot be disposed in the adapter for operation.

SUMMARY OF THE INVENTION

The present invention relates to a structure improvement of cleaner tape cartridge for a video tape recorder/player, and particularly to a practicable and innovative structure of cleaner tape cartridge, which is characterized by providing a blockader to the protective cover of a cleaner tape cartridge to block the ultraviolet ray so as to prevent undesired operation of the apparatus because this may cause unnecessary rewinding action which spoils the normal operation of cleaning a magnetic head.

BRIEF DESCRIPTION OF THE DRAWINGS

FIG. 4A is an end view of the cartridge with the cover closed.

FIG. 4B is an end view of a conventional cartridge with the cover closed.

DETAILED DESCRIPTION OF THE PREFERRED EMBODIMENT

Figure 1:
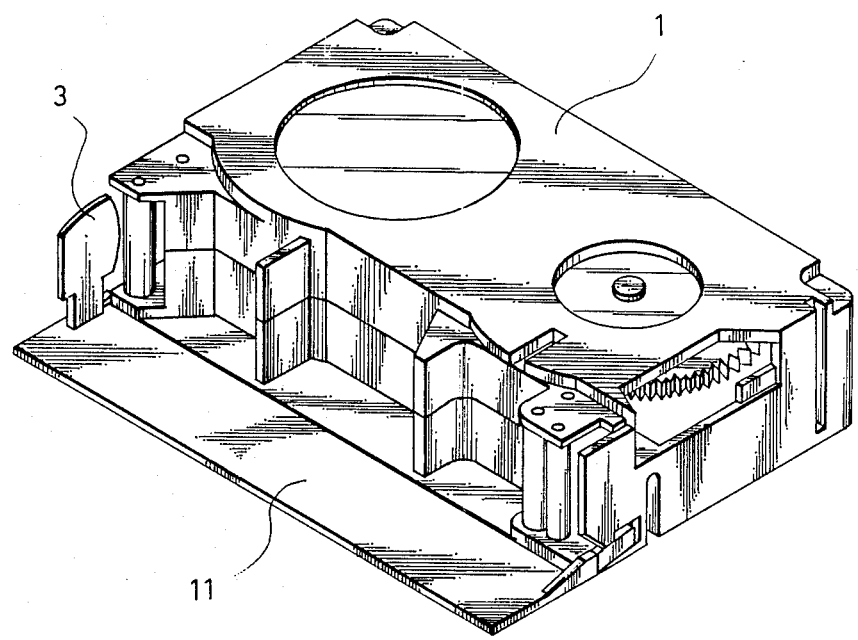
FIG. 1 is an elevational view of the a cleaner tape cartridge according to present invention.

As shown in FIG. 1, for a clearer illustration, the protective cover 11 of a video cleaner tape cartridge 1 is opened to a position in which it is parallel with a side of the body of said cartridge 1. A blockader plate 3 is directly provided on the inner side of the protective cover 11 at an angle of 90° with the said cover 11 so that the rounded shape of said blockader plate 3 permits the said cover 11 to easily close without being caught. (Normally the said cover 11 is closed as shown in FIG. 4).

Figure 2:
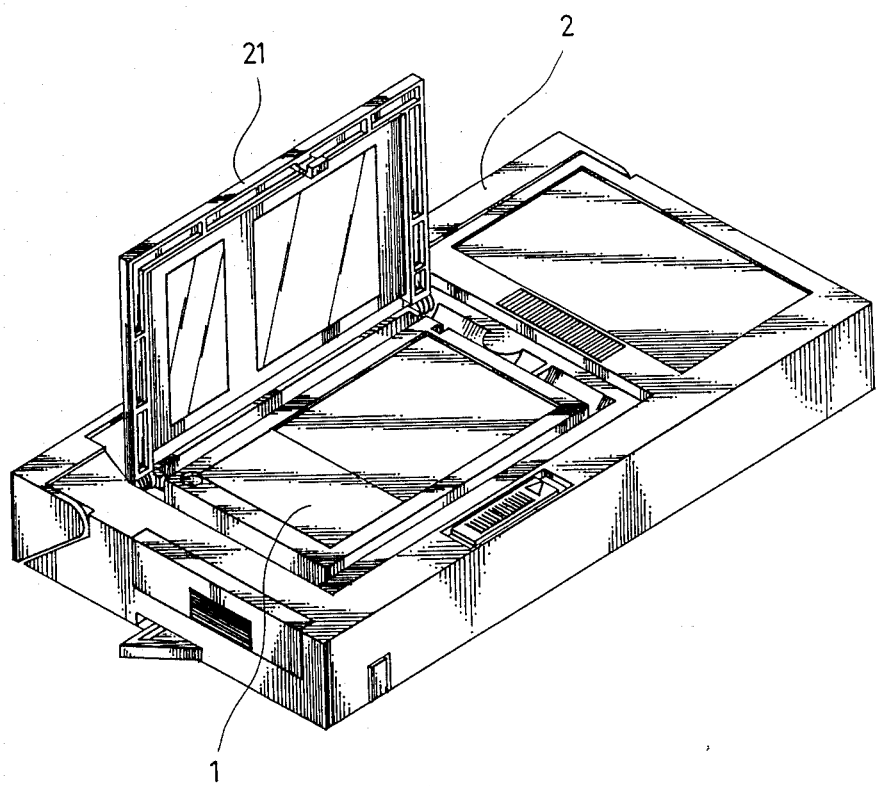
FIG. 2 is a perspective view of the cartridge received within an adaptor for use in a video tape machine.
Figure 3A:
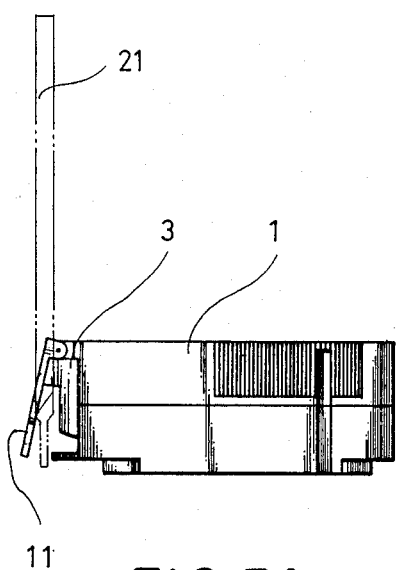
FIG. 3A is an end view of the cartridge showing a hinged cover thereof in partly closed position.
Figure 3B:
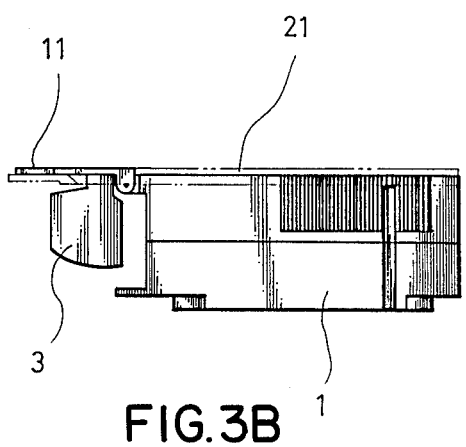
FIG. 3B is a view similar to FIG. 3A showing the cover open.

As shown in FIGS. 2 and 3, since the blockader plate 3 disposed in the body of video cleaner tape cartridge 1, is not aligned with the portion, of the cover member 21 of adapter 2, which serves to push open the cover 11, as shown in FIG. 3B, the said cartridge 1 can be smoothly disposed in the adapter 2 as shown in FIG. 2, the correlative positions of said member 21 and said cartridge 1 being shown in FIG. 3A. When the member 21 is closed, the said positions thereof are shown in FIG. 3B, the blockader plate 3 is laterally exposed to block the ultraviolet ray so that the ultraviolet ray cannot penetrate the tape to cause automatic rewinding, and the said recorder/player can operate normally in favor of proceeding with the operation of cleaning the magnetic head.

The example of using an adapter 2 has been described above, but the video cleaner tape cartridge 1 of the present invention also may be used for cleaning a VHS-C camera to enable the said cartridge 1 to be disposed therein in a state of normal play without unwanted rewinding action.

The primary object of the present invention is to offer an improved structure of a video cleaner tape cartridge with a blockader plate to block the ultraviolet ray, and the said blockader plate can be introduced without either enlarging the size of said cartridge or spoiling the appearance thereof.

In summary, the improved structure of a cleaner tape cartridge for a video tape recorder/player of the present invention is original and practicable and capable of attaining the object of the invention. With the present invention, a simple improvement eliminates the drawbacks of conventional cartridges. The improved structure of the cleaner tape cartridge for a video tape tecorder/player of the present invention is characterized by a blockader member for blocking the ultraviolet ray, which is disposed on the inner wall of the protective cover of said cartridge, the circular form of said blockader plate avoids it being caught on the cover member of the adapter and does not cause enlargement of its size. The blockader plate serves the purpose of blocking the ultraviolet ray but will not spoil the appearance of said cartridge, so it is really a preferred embodiment with a simple improvement which has a substantially great effect.

I claim:

1. A cleaner tape cartridge for a video machine having a hinged cover on one edge of the cartridge and an ultraviolet opaque blockader plate for blocking the ultraviolet rays of an automatic rewinding mechanism from passing through a video cleaning tape to reach a cooperating receiver, the plate projecting from an inner surface of the cover and extending transversely of the cover and located adjacent and inwardly of one end of the cover so that the plate is located inside the cartridge when the cover is closed.

* * * * *